Patented Dec. 28, 1926.

1,612,525

UNITED STATES PATENT OFFICE.

RANSOM S. MOTT, OF BROOKLYN, NEW YORK.

CLEANING COMPOSITION.

No Drawing. Application filed June 26, 1925. Serial No. 39,757.

This invention embodies a cleaning composition, the composition being particularly adapted for mechanics or others engaged in occupations where the hands become badly soiled, but is of especial use, also, in polishing metal utensils of all kinds, such as aluminum, brass, silver, etc., as well as for sinks, wash bowls and for all other analogous purposes.

In its preferred form, and in its entirety, it consists of the following ingredients and in approximately the proportions specified: tallow, preferably mutton, 6 pounds; soda lye (caustic soda), 8 ounces; pumice, the finest, 5 pounds; arnica leaves, ½ pound; beef gall, 1 ounce; disinfectant, such as "Lysol," 2 ounces; water, 4 quarts; prickly ash bark, ½ pound; perfume, as desired, say 2 ounces.

In the preferred manner of compounding the foregoing ingredients, the water is raised substantially to the boiling point and the arnica leaves and prickly ash bark, either before or after boiling the water, are added thereto, and the steeping or extraction process continued for about one-half hour, whereupon the fluid portion is decanted from the residuary leaves, or it may be separated therefrom by straining or filtering. The ground pumice is then added and the boiling continued for a half hour, or longer, and, during such boiling, preferably at the beginning of the operation, the lye is added. The effect of this boiling seems to be to remove or dull the sharp points or edges of the pumice and deprive it, at least to a great extent, of its gritty character, yet permit it retain its polishing and cleansing properties. While the foregoing composition or admixture is still hot, the previously melted tallow is added thereto and thoroughly mixed therewith and the boiling, under cover, continued for one-half to one hour, or longer, whereby a partial saponification, to the extent of the lye present, takes place. Thereupon the disinfectant and beef gall are added and uniformly mixed therewith, and, finally the perfume. The resulting product is poured into tin boxes or other containers and, after cooling, has the consistency of a fairly stiff paste, though it is not "cakey," but can be used conveniently as a paste. By using less water, or by continuing the boiling operations referred to above for a sufficiently long period, the product can be made to assume a solid form.

The final article is of an attractive creamy white color, agreeable to the touch, has a pleasant odor, is permanent in character, and accomplishes its intended purposes very expeditiously and efficiently and without any detrimental or injurious effect on the hands or other articles to be cleaned and polished.

By the term "Lysol" as a disinfectant, I wish to be understood as making reference to an ingredient such as described in British Patent No. 1,017 of 1890.

The product not only cleanses thoroughly, but is emollient, soothing and healing on the hands, owing to the excess of the fatty ingredient employed, and the presence of the arnica, disinfectant and beef gall. The product removes the dirt and associated substances by emulsification therewith in a gentle, harmless manner, in contradistinction to the harsh, drastic action of soap and soapy compounds.

Having thus fully described the invention, what I claim as new and desire to secure by Letters Patent is:

1. The herein described cleansing and polishing composition, consisting of the reaction products of tallow, soda lye, finely ground pumice, extract of arnica leaves, extract of prickly ash and beef gall, in substantially the proportions of 6 pounds of tallow, 8 ounces of soda lye, 5 pounds of ground pumice, the extract from one-half pound each of arnica leaves and prickly ash, and 1 ounce of beef gall.

2. The herein described cleansing and polishing composition, which results from admixing and combining tallow, soda lye, pumice which has been deprived of its sharp and gritty points and surfaces by boiling, an aqueous extract of arnica leaves and prickly ash and beef gall dissolved in the mixture.

In testimony whereof I have signed the foregoing specification.

RANSOM S. MOTT.